UNITED STATES PATENT OFFICE.

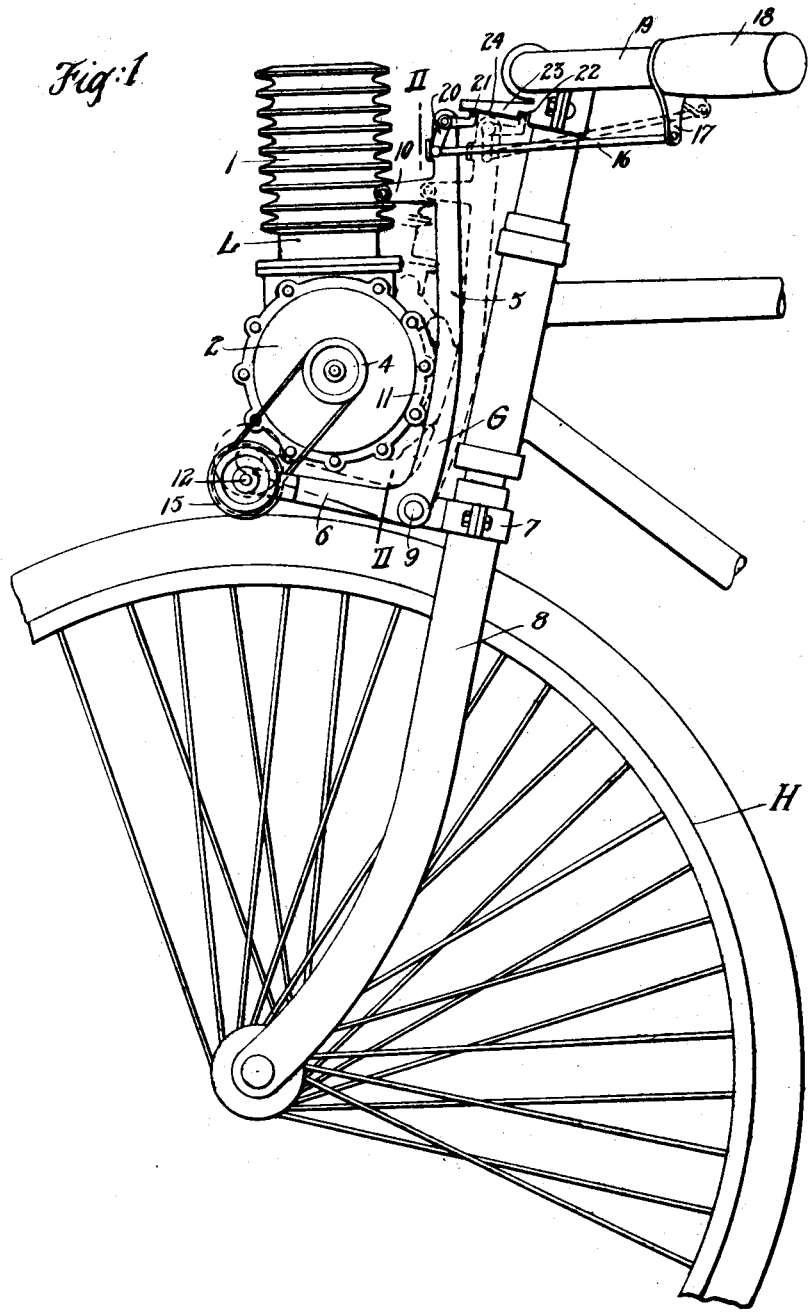

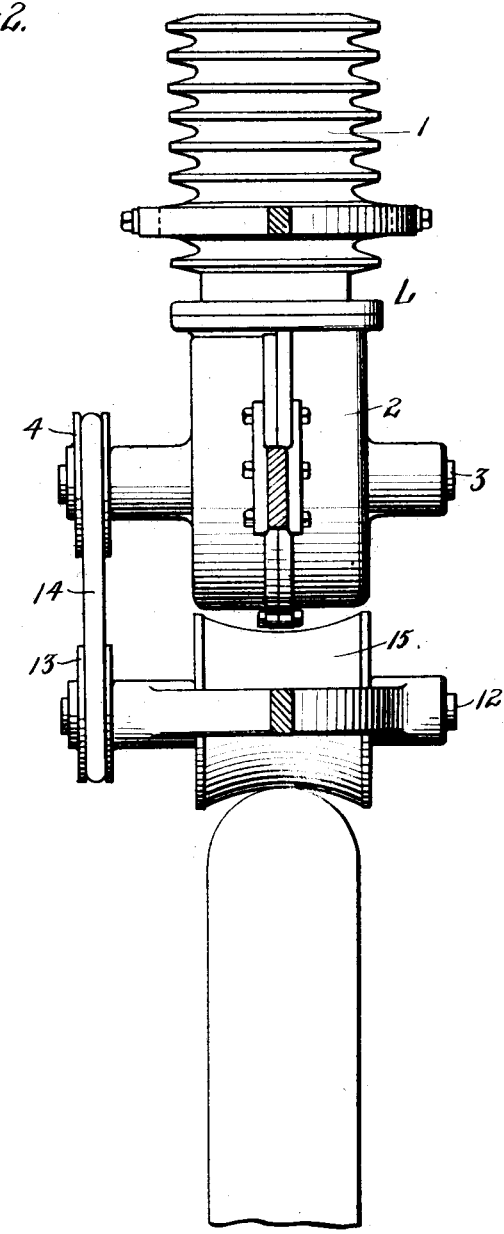

FRED EVANS, OF SUMMIT, NEW JERSEY, ASSIGNOR TO HARTSHORNE & BATTELLE, OF NEW YORK, N. Y., A FIRM COMPOSED OF EDWARD C. HARTSHORNE, SEAVEY BATTELLE, AND FREDERICK W. LUDWIG.

MOTORCYCLE.

1,369,015.      Specification of Letters Patent.      Patented Feb. 22, 1921.

Application filed November 23, 1916. Serial No. 132,947.

*To all whom it may concern:*

Be it known that I, FRED EVANS, residing at Summit, in the county of Union and State of New Jersey, have invented certain new and useful Improvements in Motorcycles, of which the following is a specification.

This invention relates to a motorcycle, and the object thereof is to provide a simple, practical and efficient supporting means whereby a motor of standard form and construction may be mounted upon a bicycle or the like and controlled for driving the wheels of the bicycle.

A more detailed object is to provide a motor supporting frame adapted to be pivotally connected to the frame of the bicycle and to carry a traction wheel driven by the motor and movable with the supporting frame into and out of driving connection with the wheel of the bicycle.

A further detailed object is to provide means, controlled from the handle bars of the bicycle, for moving the traction wheel into and out of engagement with the wheel of the bicycle, and to adapt said control means for locking the traction wheel in at least one of its positions.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claim.

In the accompanying drawings which are to be taken as a part of this specification, and in which I have shown a merely preferred form of embodiment of the invention:

Figure 1 is a side elevational view of a device constructed in accordance with this invention, showing the same in position upon a bicycle; and Fig. 2 is a vertical sectional view taken upon the plane of line II—II of Fig. 1.

Referring to the drawings for a detailed description of the structure which is illustrated therein, the reference character L indicates the motor. It is of standard form and comprises a cylinder part 1 and a crank casing 2. The crank shaft 3 carries a drive pulley 4.

The reference character G indicates the motor supporting frame. This is of L-shape comprising a vertical arm 5 and a horizontal arm 6. This supporting frame is pivotally connected to a bracket 7 which is clamped in position upon the forks 8 of the bicycle, a pivot pin 9 extending through a portion of the supporting frame at the angle between its vertical and horizontal arms and engaging the bracket 7.

The vertical arm 5 is provided with suitable attaching lugs 10 and 11 for engaging portions of the motor L whereby to fix the motor in position upon the supporting frame.

The horizontal arm 6 carries a shaft 12 at its free end, said shaft having a pulley 13 fixed thereon connected by a flexible belt or the like 14 with the pulley 4 whereby to drive the shaft 12 from the crank shaft of the motor.

A traction wheel 15 is also fixed to the shaft 12 and this is disposed to stand directly above the upper surface of the wheel H, said traction wheel being preferably slightly concaved, as illustrated, so as to better center itself upon the wheel H when driving.

Any suitable means may be employed for swinging the supporting frame about its pivotal mounting in the bracket 7 for causing the drive wheel 15 to move into and out of engagement with the upper surface of the wheel H and preferably this means comprises a link 16 which is connected to the upper end of the frame 5 and also to a finger 17 fixed upon one of the hand grips 18 of the handle bars 19. The hand grip 18 is rotatably mounted upon the handle bar 19 and is adapted to be rotated for moving the upper end of the arm 5 backwardly and forwardly at will. When the upper end of the arm 5 is moved forwardly the drive wheel 15 is moved against the wheel of the bicycle for driving said wheel, whereas when the upper end of the arm 5 is drawn backwardly the wheel 15 is lifted entirely out of engagement with the bicycle wheel.

In order that the upper end of the arm 5 may be locked in its backward position the link 16 is preferably connected to said upper end through the medium of a bell crank latch 20, said latch being pivotally connected by its central pivot to the arm 5 and the link 16 being pivotally connected to one arm of the latch, the second arm of the latch having a tooth 21 thereon arranged to be snapped into a pocket 22 formed upon a bracket 23 when the arm 5 reaches its backward position. At all other times the tooth 21 rubs against a smooth surface 24 formed upon the bracket 23.

By this means when the hand grip 18 is rotated to draw back the arm 5 the tooth 21 is pressed against the surface 24 and caused to slide backwardly therealong until it finally snaps into the pocket 23. The tooth will remain in engagement with the walls of the pocket and will thereby constitute a lock to retain the arm 5 against forward movement until the hand grip 18 is again rotated to force the link 16 forwardly. When the link 16 is forced forwardly the bell crank latch will be rotated about its pivot and the tooth will be withdrawn from the pocket and the arm 5 moved forwardly.

It should be pointed out that by the use of this invention any suitable standard motor may be employed, that is to say, that it is not necessary to change the shape or arrangement of any of the parts of the motor structure, or to manufacture a special form of motor, in order to practise this invention.

Further, the belt or chain connection between the crank shaft of the motor and the traction wheel 15 provides for all necessary variations in the measurements of the associated parts.

More particularly still, the belt or chain connection between the crank shaft of the motor and the traction wheel 15 provides just the right degree of flexibility between the motor and the traction wheel. The slight but continual momentary variations in the speed of rotation of the crank shaft are absorbed before reaching the traction wheel, and a smoother and more approved driving action is obtained upon the bicycle wheel.

Further, as clearly shown in Fig. 2, this invention provides that the traction wheel 15 and the motor are arranged substantially in a common vertical plane directly above the peripheral center of the bicycle wheel. This obviously provides for an equal distribution of weight so that the operation of steering the bicycle is not affected. A very compact and attractive appearance also results.

As many changes could be made in this construction without departing from the scope of the following claim, it is intended that all matter contained in the above description or shown in the accompanying drawing shall be interpreted as illustrative only and not in a limiting sense.

Having thus described my invention what I claim as new and desire to secure by Letters Patent is:

A device of the class described, comprising an L-shaped supporting member having parts for connecting a motor thereto, means at the angle between the arms of the L by means of which the supporting member may be pivotally connected to a bicycle frame, a traction wheel at the outer end of one of the arms of the L disposed for engaging the bicycle wheel adapted to be operatively connected to the motor, and means connected to the remaining arm of the L for swinging said supporting member about its pivotal mounting to dispose the traction wheel into and out of engagement with the wheel of the bicycle.

In testimony whereof I affix my signature in the presence of two witnesses.

FRED EVANS.

Witnesses:
L. GESSFORD HANDY,
EMMA WEINBERG.